(12) United States Patent
Bracconeri et al.

(10) Patent No.: US 10,796,311 B2
(45) Date of Patent: Oct. 6, 2020

(54) AUTHENTICATION USING TRANSACTION HISTORY

(71) Applicant: MasterCard International Incorporated, Purchase, NY (US)

(72) Inventors: Christopher Bracconeri, Tuckahoe, NY (US); Qian Wang, Ridgefield, CT (US); Shen Xi Meng, Millwood, NY (US); James An, Flushing, NY (US); Nigel Noyes, Irvington, NY (US); Arun Acharya, Tuckahoe, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 231 days.

(21) Appl. No.: 15/475,709

(22) Filed: Mar. 31, 2017

(65) Prior Publication Data

US 2018/0285877 A1 Oct. 4, 2018

(51) Int. Cl.
*G06Q 20/40* (2012.01)
*G06Q 20/38* (2012.01)
*G06Q 20/34* (2012.01)

(52) U.S. Cl.
CPC ......... *G06Q 20/4016* (2013.01); *G06Q 20/34* (2013.01); *G06Q 20/382* (2013.01); *G06Q 20/405* (2013.01)

(58) Field of Classification Search
USPC ...................................... 705/30, 44; 235/380
See application file for complete search history.

(56) References Cited

U.S. PATENT DOCUMENTS

| | | | |
|---|---|---|---|
| 5,097,115 A | * | 3/1992 | Ogasawara .......... G06Q 20/341 235/375 |
| 2006/0173776 A1 | | 8/2006 | Shalley et al. |
| 2006/0279410 A1 | * | 12/2006 | Mitani ............... H04N 1/00127 340/10.6 |

(Continued)

FOREIGN PATENT DOCUMENTS

| | | |
|---|---|---|
| EP | 1429229 A1 | 6/2004 |
| EP | 2085921 A1 | 8/2009 |
| WO | 2008/027642 A2 | 3/2008 |

OTHER PUBLICATIONS

"PCT Notification of Transmittal of the International Search Report and the Written Opinion", International Searching Authority, dated Apr. 30, 2018 (Apr. 30, 2018), for Application No. PCT/US2018/019877, 13 pgs.

*Primary Examiner* — Oluseye Iwarere
*Assistant Examiner* — Reva R Moore
(74) *Attorney, Agent, or Firm* — Buckley, Maschoff & Talwalkar LLC (57) ABSTRACT

A method and system include receiving a request to initiate a purchase transaction with a payment card product; generating a message to verify an authenticity of a cardholder of the payment card product, wherein the message includes a request for data about a previous transaction executed with the payment card product; receiving, in response to the generated message, input from the cardholder; comparing the input from the cardholder to stored data associated with the previous transaction; and one of confirming the cardholder as a true owner of the payment card product or denying the cardholder as the true owner of the payment card product based on the comparison. Numerous other aspects are provided.

19 Claims, 8 Drawing Sheets

(56) References Cited

U.S. PATENT DOCUMENTS

2008/0040276 A1\* 2/2008 Hammad ............. G06Q 20/401
 705/44
2010/0114776 A1\* 5/2010 Weller ................. H04L 9/3213
 705/44

\* cited by examiner

| Transaction Date | Transaction Amt | Transaction Location | Transaction Item | Commercial Name |
|---|---|---|---|---|
| 1/1/17 | 100 | Purchase, NY | toy + | ToyStore |
| 12/3/16 | 200 | Purchase, NY | sweater | BigDepartmentStore |
| 12/1/16 | 103 | Purchase, NY | groceries | GroceryGiant |
| 11/27/16 | 200 | New York, NY | food | Restaurant X |

FIG. 7

AUTHENTICATION USING TRANSACTION HISTORY

BACKGROUND

When a consumer makes a purchase with a payment card product (e.g., a credit card or a debit card), there are procedures or rules the recipient of the payment account number (PAN) associated with the payment card product may follow to determine the validity of the card. For example, a cardholder verification method (CVM) may have the cardholder complete the transaction with a PIN, or answer a security question.

The present inventors have now realized that it may be desirable to provide more effective cardholder verification methods.

SUMMARY

According to a first aspect of the invention a method is described, the method comprising the steps of receiving a request to initiate a purchase transaction with a payment card product; generating a message to verify an authenticity of a cardholder of the payment card product, wherein the message includes a request for data about a previous transaction executed with the payment card product; receiving, in response to the generated message, input from the cardholder; comparing the input from the cardholder to stored data associated with the previous transaction; and one of confirming the cardholder as a true owner of the payment card product or denying the cardholder as the true owner of the payment card product based on the comparison.

According to a second aspect of the invention a system is described, the system comprising a device operative to receive a request to initiate a purchase transaction with a payment card product; a database for storing previous transaction data associated with execution of a previous transaction via a payment card product; an authentication module operative to authenticate a true owner of the payment card product; a memory for storing program instructions; an authentication processor, coupled to the memory, and in communication with the authentication module, and operative to execute program instructions to: receive a request to initiate a purchase transaction with the payment card product; generate a message to verify an authenticity of a cardholder of the payment card product, wherein the message includes a request for data about the previous transaction executed with the payment card product; receive, in response to the generated message, input from the cardholder; compare the input from the cardholder to the stored previous transaction data in the database; and one of approve the cardholder as a true owner of the payment card product or decline the cardholder as the true owner of the payment card product based on the comparison.

DETAILED DESCRIPTION

When a consumer makes a purchase with a payment card product (e.g., a credit card or a debit card), there are procedures or rules the recipient of the payment account number (PAN) associated with the payment card product may follow to determine the validity of the card. For example, a cardholder verification method (CVM) may be used to evaluate whether the person presenting the card is the legitimate cardholder, and may have the cardholder complete the transaction with a PIN, signatures, offline plaintext PIN, offline enciphered PIN, offline plaintext PIN and signature, offline enciphered PIN and signature, online PIN, or answer a security question related to information about the cardholder ("personal security question"). However, card authentication is a rising concern for fraud management. While cards having computer chips embedded therein (e.g., EMV cards) may be more resistant to fraud than cards having magnetic strips, fraud is expected to rise as these EMV cards are circulated. For example, in addition to track-two data on a magnetic stripe, EMV cards generally have identical data encoded on the chip, which may be read as part of the normal EMV transaction process. If an EMV terminal/reader is compromised to the extent that the conversation between the card and the terminal is intercepted, for example, the then attacker may be able to recover both the track-two data and the PIN, allowing construction of a magnetic stripe card, which, while not usable in a Chip and PIN terminal, may still be used. The fraud may exist for card-present transactions and card-not-present transactions.

The present inventors have now realized it may be desirable to reduce fraud associated with physical card loss/theft and card cloning (not physical card loss) via more effective CVM methods than PIN entry and personal security questions. Embodiments provide for storing a history of previous transactions either on the computer chip of the EMV payment card product or at an Issuer of the payment card product, and then having the cardholder enter previous transaction information for authentication. The cardholder may enter the previous transaction information at the point of sale (POS) device for card-present transactions, and may enter the previous transaction information via the application/website interface for card-not-present transactions. The use of previous transaction information as entered by the cardholder in accordance with embodiments may reduce card-present fraud due to cloning. One or more embodiments provide for dynamic data authentication for protection against modification of data and cloning. The inventors note that the use of previous transaction information as entered by the cardholder in accordance with embodiments may take advantage of existing technology, thereby making the CVM process more efficient, and may promote loyalty of cardholders to use only cards having this CVM process, as it is more secure.

Figure 1:
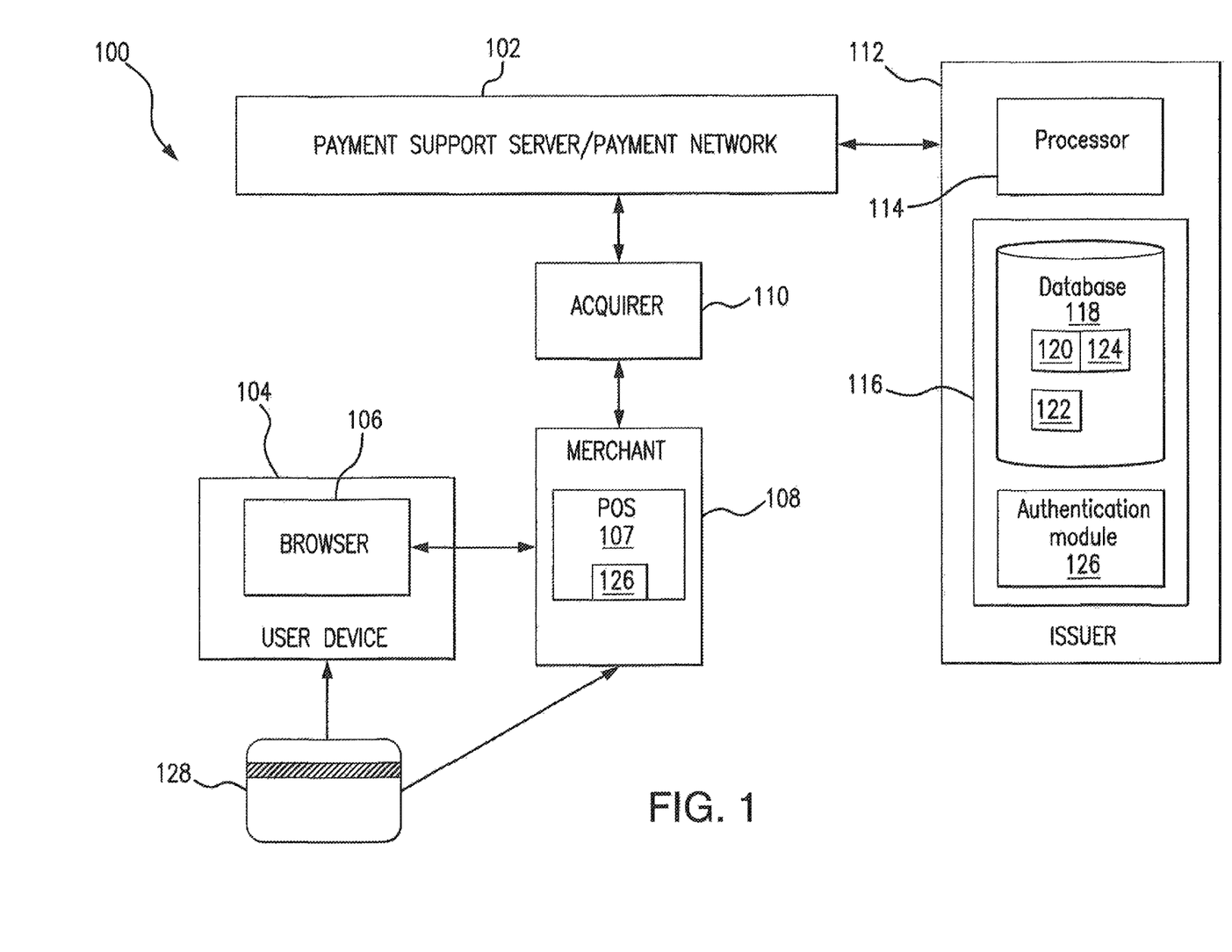
FIG. 1 is a schematic block diagram representation of a payment system, in accordance with some aspects of some embodiments herein.

FIG. 1 is a block diagram that illustrates a payment system 100 provided in accordance with aspects of the present disclosure.

Each block shown in FIG. 1 may be taken to represent a party that participates in, or facilitates, a payment transaction and/or one or more computing devices operated by such party.

Block 102 in FIG. 1 represents a payment network as well as one or more payment support services computers operated in association with the payment network. These facilities may in some cases below be referred to either as "payment support services computer 102" and/or "payment network 102," since all of these facilities may, in some embodiments, be constituted by a single computer or a group of cooperating computer systems.

It should also be understood that, in many of its functions, the payment network 102 may duplicate or closely resemble the functionality of existing payment networks.

Block 104 in FIG. 1 represents a user device by which the user may access and interact with an e-commerce website. The user device 104 may be, for example, a personal computer or a smartphone that runs a mobile browser, in one or more embodiments. In other possible embodiments, the user device 104 may be a tablet computer, a laptop computer, a game console or a smartwatch. One software feature of the user device 104 may be a browser program 106. The browser program 106 may handle internet-based interactions between the user device 104 and other devices. For present purposes, such other devices may include a merchant computer 108 associated with a merchant that operates an e-commerce website. In one or more embodiments, when the user device is a smart device, the browser program 106 may be a mobile browser or application. In one or more embodiments, as described further below, a request is made to the cardholder to enter previous transaction information. The request and response to the request may be facilitated via the mobile application or browser program 106. As is well known in the art, and as used herein, an application ("app") refers to a self-contained program or piece of software designed to fulfill a particular purpose.

The hardware and software features of a typical user device 104 are familiar to those who are skilled in the art, and need not be described or illustrated in detail. It is sufficient to note that the user device 104 most likely includes a processor (not separately shown) of some type, programmed and controlled by software instructions stored in one or more memory devices (not separately shown), which are also part of the user device 104.

Block 108 in FIG. 1 represents a merchant device, which may include a computer to operate an e-commerce web-side and receive payment information from the cardholder for the purchase, as described above, and/or may include a Point of Sale (POS) device 107 by which the merchant may enter information about the goods to be purchased, and which may receive payment information from the cardholder for the purchase. In one or more embodiments, the POS device 107 may be a POS terminal (e.g., a fixed POS station) or a suitable programmed mobile telephone or PDA (personal digital assistant) with communication capabilities (e.g., a wireless POS station). (The latter two possible embodiments of the merchant device may for example be particularly appropriate for merchants who operate without a fixed place of business. Examples of such merchants may be flea market sellers, artisans and crafters who sell their handiwork at craft fairs, itinerant merchants or merchants in third world marketplaces.) The merchant device 107 may be operated in any type of business establishment or retail store, including a "mom and pop" operation all the way up to a "big box" store that is part of a large retail chain. Among other capabilities, and as will be described further below, the merchant device 107 may display transaction information to be read by the customer (not shown) and information manually inputted by the customer, or manually entered by a merchant clerk on behalf of the consumer. For example, the merchant device may display an authentication request message 500 (FIG. 5) and the current cardholder may enter a response, as will be further described below.

An acquirer processor 110 operated by an acquirer (acquiring financial institution) is also shown as part of the system 100 in FIG. 1. As used herein, the acquirer processor may be referred to as "acquirer." The acquirer processor 110 may operate in a conventional manner to receive payment account transaction data from a merchant 108 via a computer browser (e.g., for e-commerce purchases) or processing device, such as a Point of Sale (POS) device 107 associated with the merchant 108. The Acquirer 110 may request the PAN and once the Acquirer receives the PAN, the Acquirer 110 may generate an authorization request record. The authorization request record may include transaction data (e.g., payment card account number (PAN), the amount of the total purchase transaction, cash back (if any), and other information.) Once the acquirer processor 110 receives a confirmation of an authentication of the cardholder, the acquirer processor 110 may route the transaction authorization request via the payment network 102 to an issuer domain 112, for authorization to complete the transaction, for example.

In one or more embodiments, the issuer 112 may include a server computer and/or processor 114 operated by the issuer of a payment card account that the cardholder has elected to employ for the payment account transaction. An authorization response record generated by the issuer processor 114 may be routed back to the merchant 108 via the payment network 102 and the acquirer processor 110. In one or more embodiments, the authorization request record and the authorization response record may collectively be referred to as an authorization record 122.

The issuer processor 114 may be operated by or on behalf of a financial institution or Issuing Bank ("Issuer") that issues the payment accounts to individual users. For example, the issuer processor 114 may perform such functions as (a) receiving and responding to requests for authorization of payment account transactions to be charged to payment accounts issued by the Issuer; (b) tracking and storing transactions and maintaining account records; and (c) receiving and responding to requests for authentication of a cardholder. One function worth noting at this point is that the Issuer may be a source of cardholder authentication data.

The Issuer 112 may include a storage device/memory 116. The storage device 116 may comprise any appropriate information storage device, including combinations of magnetic storage devices (e.g., a hard disk drive), optical storage devices, mobile telephones, and/or semiconductor memory devices. In some embodiments, the storage device 116 may further store a database 118, which may include an authentication record 120, the authorization record 122 and a clearing record 124. In one or more embodiments, the Issuer 112 may analyze the information received from the Acquirer 110 and may determine whether the transaction is authorized. In one or more embodiments, the Issuer 112 may return an authorization response to the merchant 108 via the payment network 102 and Acquirer 110, each of whom may alter/enhance the record on its way back to the merchant 108.

In one or more embodiments, an authentication module 126 is also shown as part of the system 100 in FIG. 1. In one or more embodiments, the authentication module 126 may be included in at least one of the issuer 112 and the POS device 107. As will be described further below, the authentication module 126 may, in one or more embodiments, determine whether the cardholder is the true owner of the payment card product 128. In one or more embodiments, the issuer processor 114 or a processor (not shown) associated with the POS device 107, may, for example, be a microprocessor, and may be programmed to operate to control the overall functioning of the authentication module 126, as described herein.

As used herein, the payment card product 128 (e.g., all MasterCard brands—MasterCard, Cirrus and Maestro) may be any type of credit, debit or pre-paid card. Other suitable payment cards may be used.

The components of the system 100 as depicted in FIG. 1 are only those that are needed for processing a single transaction. A typical payment system may process many purchase transactions (including simultaneous transactions) and may include a considerable number of payment account issuers and their computers/processors, a considerable number of acquirers and their computers/processors, and numerous merchants and their computer systems. The system 100 may also include a very large number of payment account holders/users (consumers), who may use their payment accounts for online shopping transactions.

As used herein, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 2:
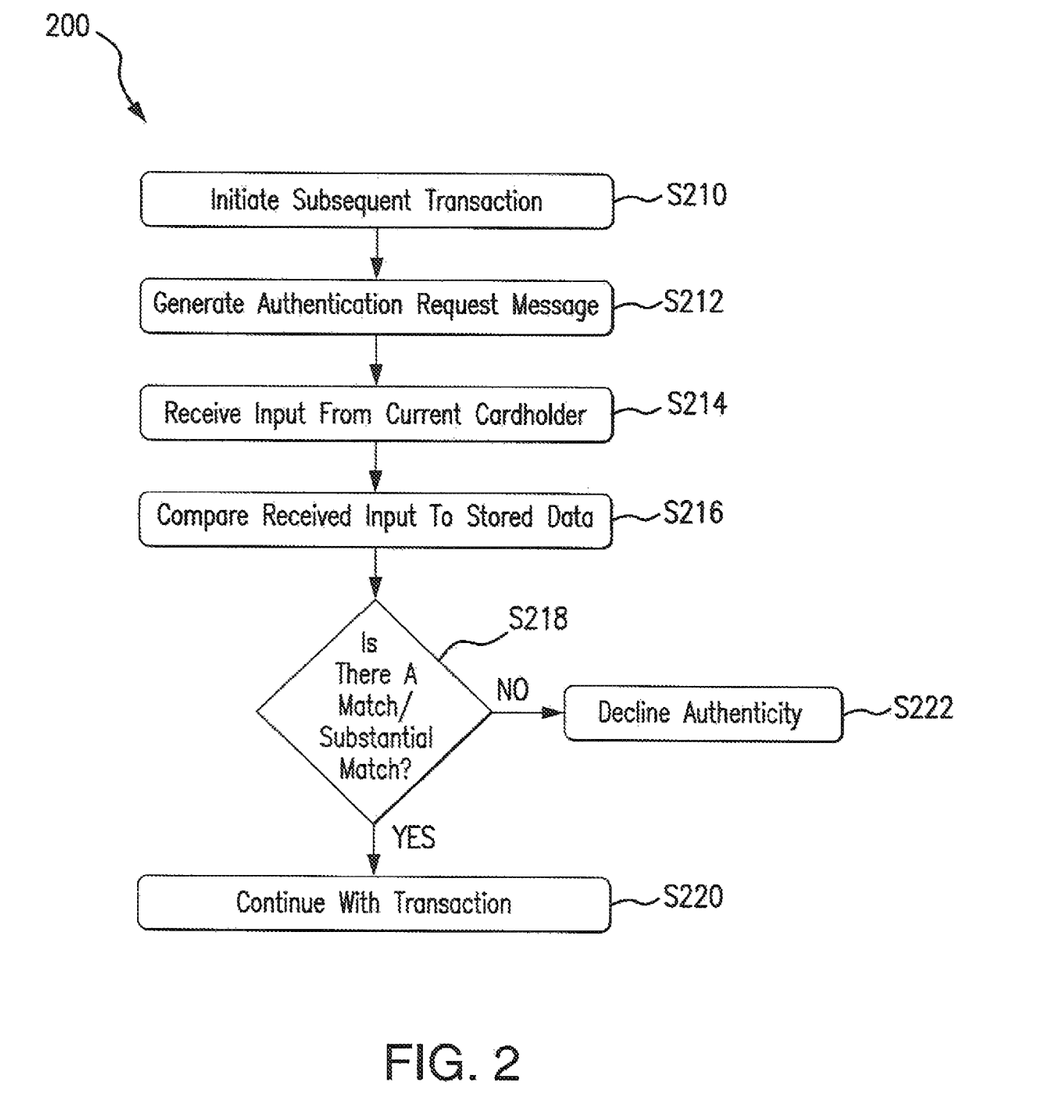
FIG. 2 is a flow diagram illustrating a process that may be performed in accordance with some aspects of some embodiments herein.

FIG. 2 illustrates an example of operation according to some embodiments. In particular, FIG. 2 provides a flow diagram of a process 200, according to some embodiments, that may be performed by some or all of the elements of the system 100 described with respect to FIG. 1. The flow chart(s) described herein do not imply a fixed order to the steps, and embodiments of the present invention may be practiced in any order that is practicable. Note that any of the processes described herein may be performed using any suitable combination of hardware (e.g., circuit(s)), software or manual mean. For example, a non-transitory computer-readable storage medium (e.g., a fixed disk, a floppy disk, a CD, a DVD, a Flash drive, or a magnetic tape) may store thereon instructions that when executed by a machine result in performance according to any of the embodiments described herein. In one or more embodiments, the system 100 is conditioned to perform the process 200, such that the system 100 is a special purpose element configured to perform operations not performable by a general purpose computer or device.

In one or more embodiments, prior to beginning process 200, a cardholder executes a first transaction using the payment card product 128. Data about the first transaction may be stored (e.g., in a database 700 (FIG. 7) or other storage medium) on the payment card product 128 (e.g., on a computer chip embedded in the card) and/or at the Issuer 112. In one or more embodiments, the payment card product 128 may provide an application file locator (AFL), a list of files and records that the terminal needs to read data from the payment card product 128. The payment card product 128 may store the data in files. The AFL may contain the files that contain the EMV data. In one or more embodiments, the files and EMV data may be read using a read record command. The EMV may not specify which files data is stored in, so all the files may be read. The transaction data may include, for example, an amount of the transaction, a location of the transaction, the items purchased in the transaction, and the commercial entity associated with the transaction. Other suitable transaction data may be stored. For example, John uses his payment card product 128 to purchase a sweater for a hundred U.S. dollars at BigDepartmentStore on Main Street in Purchase N.Y.

Figure 3A:
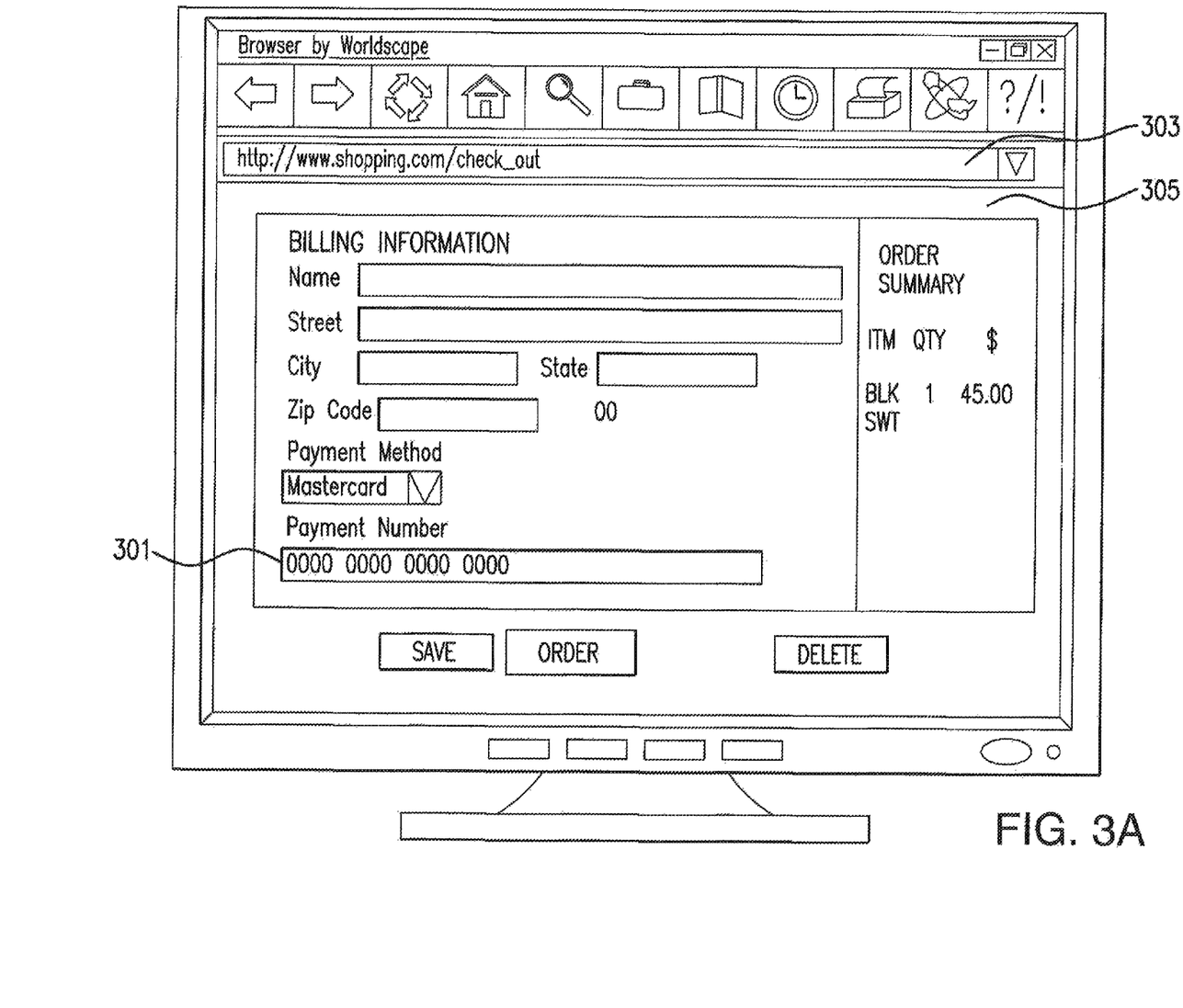
FIG. 3A is an outward view of a graphical interface, in accordance with some aspects of some embodiments herein.

Initially at S210, a cardholder initiates a subsequent transaction, after the first transaction, with a merchant 108. In one or more embodiments, the cardholder initiates the transaction by providing their physical payment card product 128 to the POS device 107 (e.g., via insertion of the payment card product 128 into the POS device 107 or positioning the payment card product 128 within a prescribed proximity to the POS device 107) or by providing a PAN associated with the payment card product 128 to the merchant 108 (e.g., on a user interface 305 of an e-commerce website 303 associated with the merchant via a browser or an app) (e.g., FIG. 3A).

Then in S212, at least one authentication request message 300 ("message") is generated. In one or more embodiments, the message 300 may be presented to the cardholder via the user interface of the POS device 107 (message 500 in FIG. 5) or via the user interface 305, the computer (300 in FIG. 3B) or the user interface of the browser associated with the mobile device (message 400 in FIG. 4), for example. The message 300 may be an inquiry to determine whether the current cardholder is the true owner of the payment card product 128. The message 300 may ask the current cardholder for data about a previous transaction. In one or more embodiments, the message 300 may be in the form of several questions. The data may be about at least one of a previous transaction amount 302, a previous transaction item or category of item 304, a previous transaction location 306 and a previous transaction commercial entity 308. Other suitable previous transaction data may be used. As used herein, "the previous transaction" may refer to any transaction executed with the payment card product 128 prior to the present transaction described in process 200. The inventors note that while the most recent transaction may be the most easily recalled by the current cardholder, it may be desirable to pick an earlier transaction.

Figure 3B:
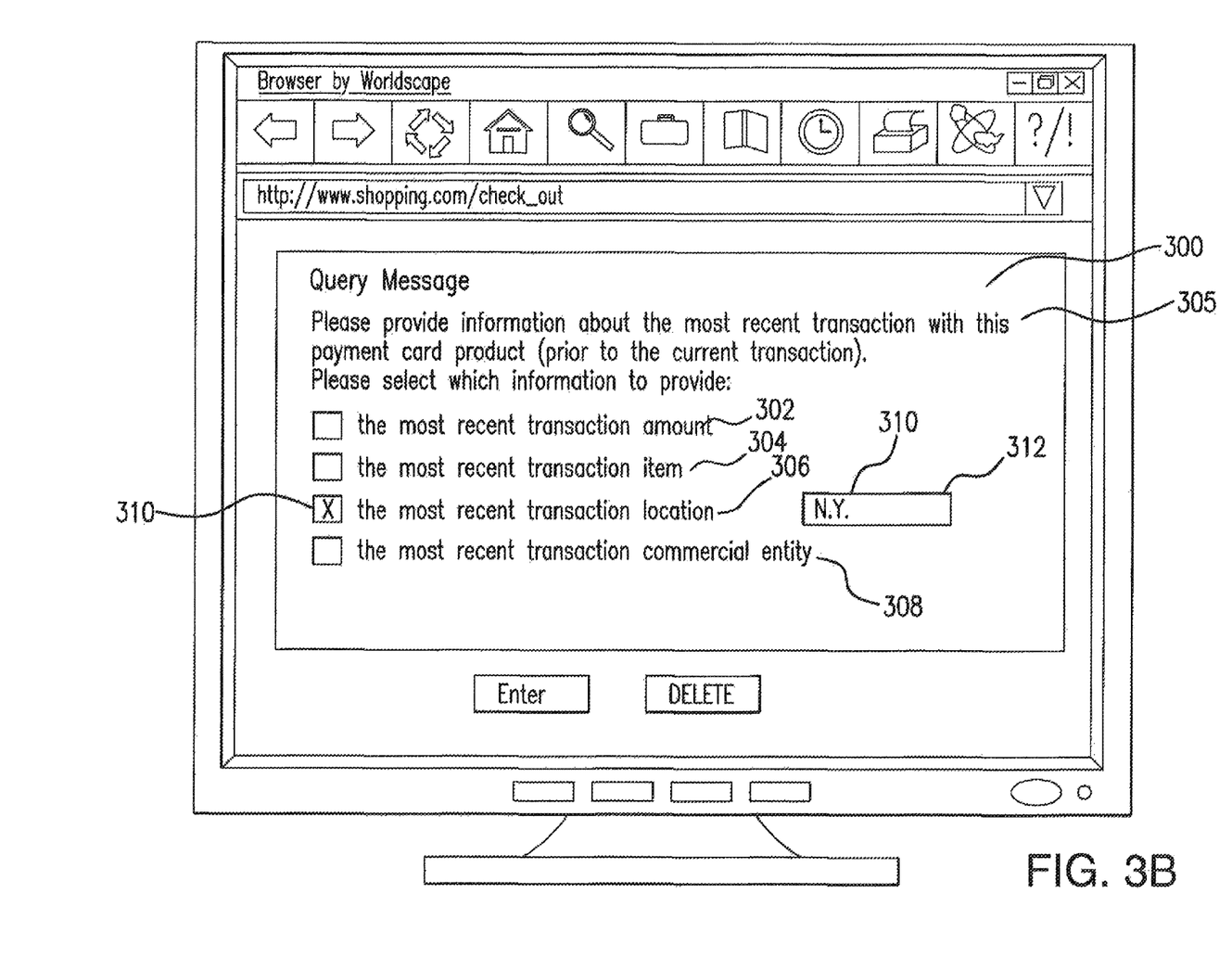
FIG. 3B is an outward view of a graphical interface, in accordance with some aspects of some embodiments herein.
Figure 4:
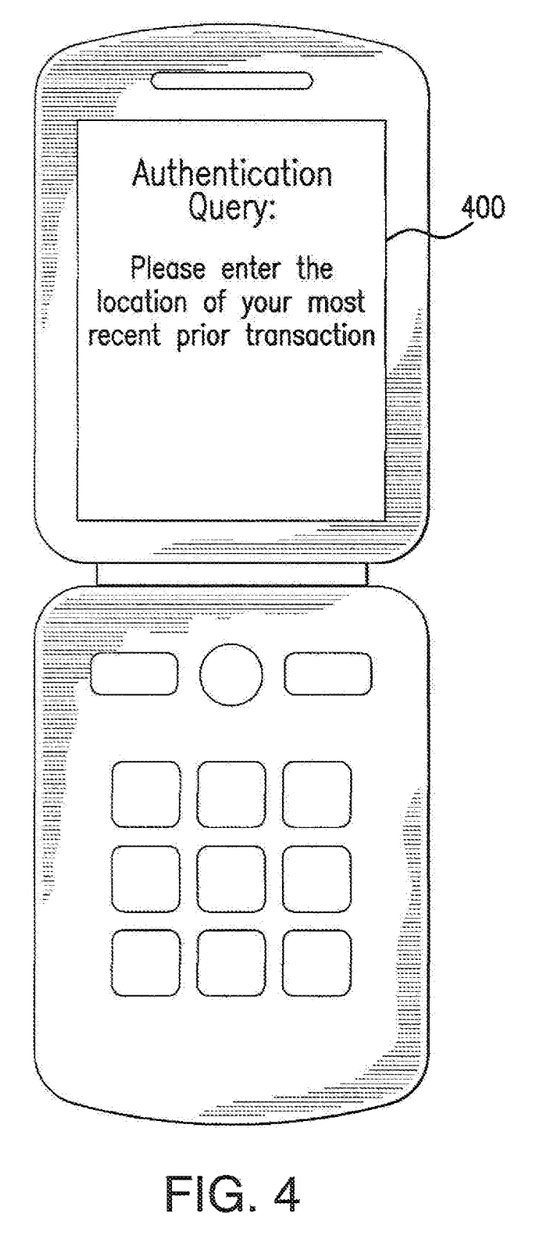
FIG. 4 is a mobile device including an outward view of a graphical interface in accordance with some aspects of some embodiments herein.

Then in S214, input 310 from the current cardholder is received in response to the generated message 300. In one or more embodiments, the message 300 may specify whether the previous transaction is the most recent transaction or a transaction prior to the most recent transaction. In one or more embodiments, the current cardholder may select which previous transaction they would like to answer a question about (e.g., most recent transaction or other previous transaction). In other embodiments, the specific previous transaction may be pre-set by the system 100. In one or more embodiments, the current cardholder may select which question type they would like to answer (e.g., transaction amount, transaction item, transaction location, transaction commercial entity, etc.). In one or more embodiments, selection of the question type, may result in generation of an input field 312 (FIG. 3B) to receive the cardholder input 310. In one or more embodiments, the input field 312 is present on the interface 305 prior to selection of the question type. In one or more embodiments, the question type may be provided by the system 100 instead of in response to user selection, as shown in FIG. 3B.

In keeping with the example described above, the message 300 states "Please provide information about the most recent transaction with this payment card product (prior to the current transaction). Please select which information to provide: the most recent transaction amount 302; the most recent transaction item 304; the most recent transaction location 306; the most recent transaction commercial entity 308." John selects the most recent transaction location 306, as indicated by the "x" 310 in the box, and then inputs data indicating that the most recent previous transaction location was N.Y.

In one or more embodiments, the received input is compared to stored data associated with the previous transaction in S216. In one or more embodiments, the authentication module 126 may identify which previous transaction the received input relates to (e.g., most recent previous transaction, second most recent previous transaction, etc.), and then determine if the received input matches the stored data associated with the respective previous transaction. In one or more embodiments, in an instance where the card is not present at the transaction (e.g., transaction via the web browser/merchant), the authentication module 126 may access the data in the database 118/700 (FIG. 7) stored at the Issuer 112. In one or more embodiments, in an instance where the card is present at the transaction (e.g., transaction via the POS device 107), the authentication module 126 may access the data in the database 118/700 (FIG. 7) stored on the chip embedded in the payment card product 128. As described above, the stored data may, in either the chip or Issuer instance, be stored in a database or any other suitable storage medium.

In one or more embodiments, the authentication module 126 may determine at S218, whether the received input matches or substantially matches the stored data. In one or more embodiments, the authentication module 126 may determine the received input does match or substantially match the stored data when at least one of: the received input is exactly the same as the stored data, and the received input is not exactly the same as the stored data, but does not exceed some pre-defined threshold value. For example, if the received input indicated the previous transaction was for one hundred and one (101) US dollars, and the stored previous transaction data indicated the previous transaction was for one hundred (100) US dollars, the authentication module 126 may determine that the one dollar difference does not exceed the pre-defined threshold value, and the received input does substantially match the stored data.

When the authentication module 126 determines at S218 that the received input matches or substantially matches the stored data, the process 200 may proceed to S220 and it is confirmed that current cardholder is the true owner of the payment card product 128, and the transaction may continue, including a request to authorize the transaction.

In one or more embodiments, at least one of the memory of the payment card product and the memory associated with the issuer of the payment card product are updated with data associated with the initiated purchase transaction when the initiated purchase transaction is completed.

In one or more embodiments, the payment card product 128 must be valid and have a sufficient credit line to allow the purchase. The Issuer 112 may determine whether to approve or decline the authorization request record, based on standard business logic, and then may respond to the authorization request by generating the authorization response record. In one or more embodiments, the response message may be limited to approved or declined. Then, in one or more embodiments, the authorization response record may be transmitted to the merchant 108 via the payment network 102/Acquirer 110. If the authorization response record from the Issuer 112 is positive, the Acquirer 110 sends an approved authorization message to the merchant 108 with the appropriate data suitable elements. If the authorization response record from the Issuer 112 is negative, the Acquirer 110 sends a decline authorization message to the merchant 108.

If all is in order, and the Issuer 112 transmits a positive authorization response to the merchant 108, the transaction is then completed and the customer leaves the store with the goods. A subsequent clearing transaction initiated by the merchant results in a transfer of the transaction amount from a customer's payment card account to an account that belongs to the merchant. The merchant 108 may generate the clearing record based on the completed transaction and may send the clearing record through the same path to the Issuer 112. The customer's payment card account may be, for example, either a debit card account or a credit card account. In the former case, the clearing transaction results in the funds being debited directly from the account. In the latter case, the clearing transaction results in a charge being posted against the account, and the charge subsequently appears on the cardholder's monthly credit card statement. During the clearing transaction, the clearing record 124 may be generated.

For example, in the case of the card present at the POS device 107, the POS device, after the current cardholder is authenticated as the true cardholder, may then send an authorization request including transaction information, to the Issuer 112, by way of the Acquirer 110, with whom the merchant maintains a relationship, and the Payment Network 102, as described above, to authorize the transaction. In one or more embodiments, the authorization request may be sent simultaneously or substantially simultaneously with the execution of the authentication module 126. In one or more embodiments, while the authentication module 126 at the POS device 107 is determining the authenticity (e.g., if the current cardholder is the true cardholder) of the current cardholder, an authentication request may be sent simultaneously or substantially simultaneously to the Issuer 112 (e.g., via the Acquirer 110 and payment network 102) to access previous transaction information, and the information returned from the authentication module 126 at the POS device 107 may be compared to the information returned by the Issuer 112.

As another example, in the case of the card-not-present (e.g., browser via the merchant), the authentication request may be sent to the Issuer 112 (e.g., via the Acquirer 110 and the payment network 102) simultaneously or substantially simultaneously with the authorization request. In one or more embodiments, the authentication request may be sent to the Issuer 112, and a determination as to authenticity made, prior to sending the authorization request to the Issuer 112.

In one or more embodiments, when the authentication module 126 determines at S218 that the received input does not match or does not substantially match the stored data, the process 200 may proceed to S222 and the current cardholder is denied as the true owner of the payment card product 128, and the transaction may end. In one or more embodiments, a deny response for the authentication request may be generated after the determination that the received input does not match/substantially match the stored data. In one or more embodiments, for a card is present transaction, if the authentication module 126 determines the received input does not match the data stored on the chip, the POS device 107 may send an authentication request to the Issuer 112 (e.g., via the Acquire 110 and payment network 102) to confirm the denial. The Issuer 112 may then execute the authentication module 126 at the Issuer 112, as described above for the card-not-present instances. In one or more embodiments, when the authentication request is denied, the purchase transaction may not proceed. In one or more embodiments, when the authentication request is denied, a particular authorization decision code may be assigned and recorded for risk purposes. In one or more embodiments, in the event the input data does not match or substantially match the stored data, the current cardholder may receive another opportunity to input data (e.g., to enter another answer and/or to change the request message).

In one or more embodiments, the authentication process 200 may be in addition to, or instead of, standard cardholder verification methods (e.g., entry of a personal identification number (PIN), signature, and/or card verification code (CVC) when prompted by the merchant). In one or more embodiments, approval by all authentication/verification methods may be needed to complete the transaction.

The foregoing description of the exemplary transaction may be considered to be somewhat simplified in some respects. For example, a merchant processing system (not shown) may be interposed between the merchant device and the Acquirer. As is familiar to those who are skilled in the art, a merchant processing system may be operated by or on behalf of the merchant to form part of the communications path between the Acquirer and a considerable number of merchant devices operated by the merchant. It is also often the case that a third party transaction processing service, such as a payment services provider (PSP), may operate to handle payment card transactions on behalf of the acquirer and on behalf of a large number of other like financial institutions.

Figure 5:
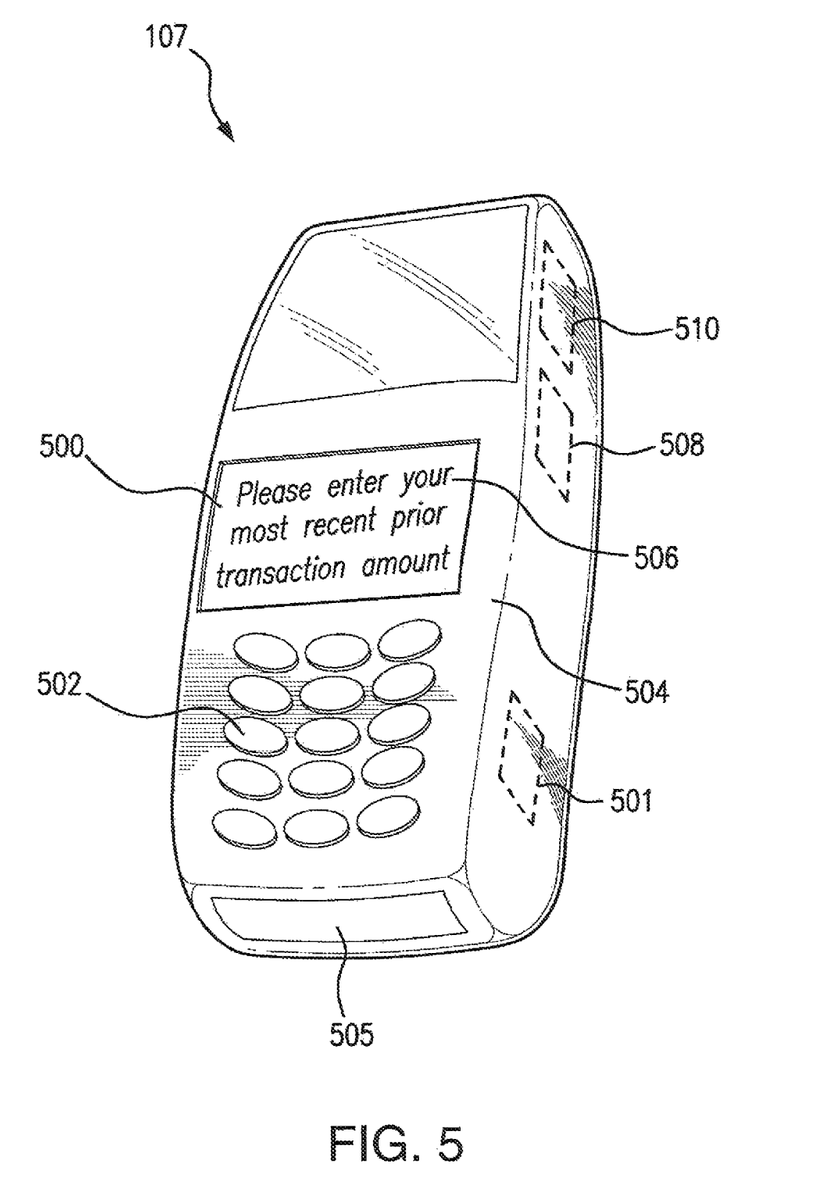
FIG. 5 is merchant device in accordance with some aspects of some embodiments herein.

FIG. 5 is a diagram of a merchant POS device 107 as provided in accordance with aspects of the invention, and in particular, a merchant POS terminal. In some embodiments, the POS device 107 may be largely or entirely conventional in its hardware aspects. The POS device 107 may be programmed in accordance with aspects of one or more embodiments to provide functionality as described herein.

The POS device 107 may include one or more processing elements 501. The processor 501 may, for example, be a conventional microprocessor, and may operate to control the overall functioning of the POS device 107. The POS device 107 may also include conventional peripheral components, in communication with and/or controlled by the processor, including but not limited to: (a) a keypad 502 for receiving input from the human operator of the POS terminal or a customer; (b) a magnetic stripe reader 504 for reading payment card account numbers and related information from magnetic stripe payment cards or slots 505 to insert chip cards or antenna for contactless transactions; (c) one or more displays 506 for providing output (e.g., authentication request message 500; identifying products presented for purchase and their prices, indicating transaction subtotals and totals, indicating transaction status, etc.); and (d) a communication controller 508 for allowing the processor, and hence the POS device 107 to engage in communication over data networks with other devices (e.g., a merchant processing system (not shown), an acquirer 110 or its transaction processor (not shown), an issuer 112, etc.). In one or more embodiments, at least one of the displays 506 may be a touch screen, so as to provide an input function as well as an output function. In one or more embodiments, the POS device 107 may include one or more memory and/or data storage devices 510, which may comprise any combination of one or more of a hard disk drive, RAM (random access memory), ROM (read only memory), flash memory, etc. The memory/data storage devices 510 may store software (e.g., authentication module 126) and/or firmware that programs the processor 501 and the merchant POS terminal to perform functionality as described herein.

Figure 6:
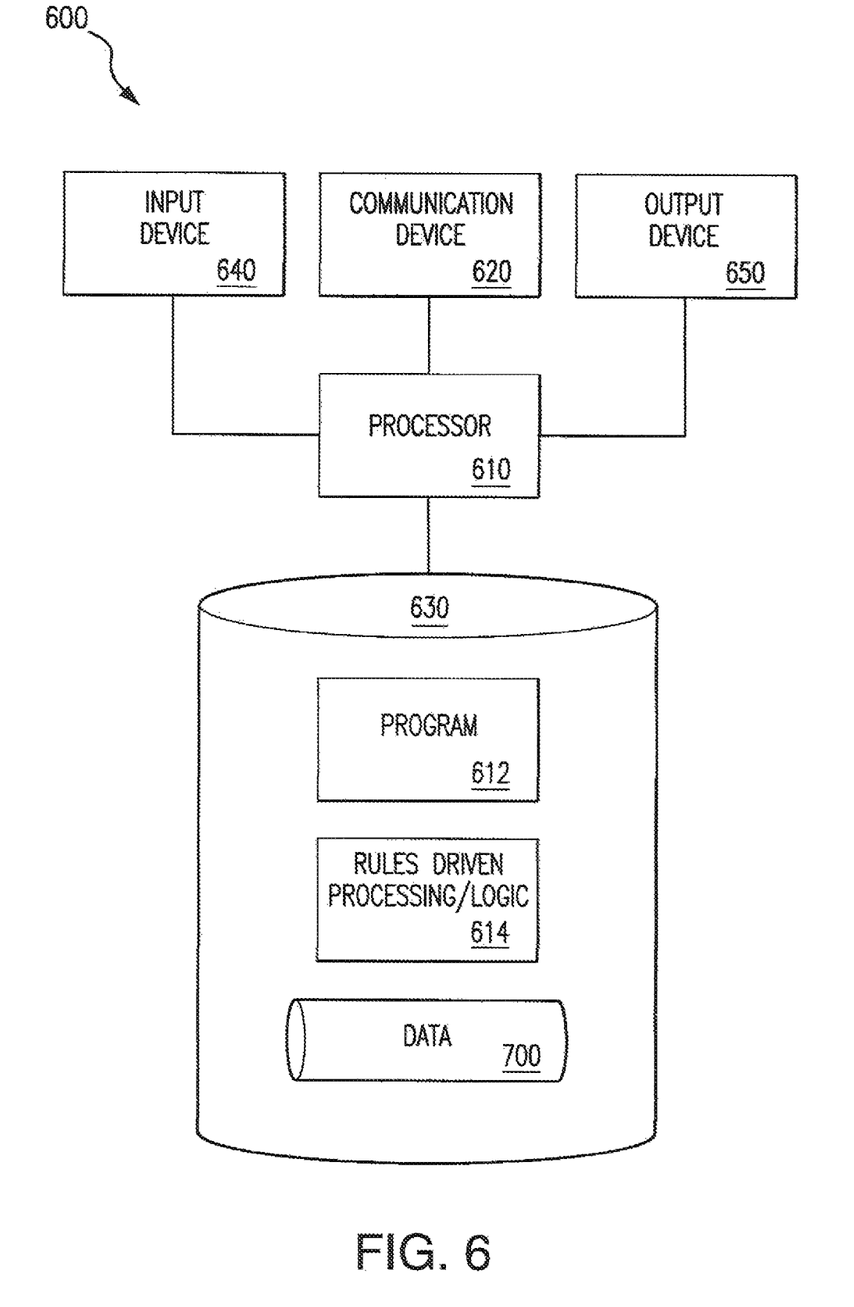
FIG. 6 is a block diagram of a system, in accordance with some aspects of some embodiments herein.

Note that the embodiments described herein may be implemented using any number of different hardware configurations. For example, FIG. 6 illustrates an Authentication Platform 600 that may be, for example, associated with the system 100 of FIG. 1. In one or more embodiments, the platform 600 may be stored at at least one of the merchant POS 107 and the Issuer 112. The Authentication Platform 600 comprises an authentication processor or module 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more users or computers. The Authentication Platform 600 further includes an input device 640 (e.g., a computer mouse and/or keyboard to enter information) and an output device 650 (e.g., a computer monitor or printer to output a transaction information report).

The processor 610 also communicates with a storage device/memory 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or authentication platform logic 614 for controlling the processor 610. The processor 610 performs instructions of the programs 612, 614, and thereby operates in accordance with any of the embodiments described herein. For example, the processor 610 may receive an authentication request which may then be analyzed by the processor 610 to automatically determine whether the current cardholder is the true cardholder.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" or "retrieved" by or "transmitted" to, for example: (i) the Authentication Platform 600 from another device; or (ii) a software application or module within the Authentication Platform 600 from another software application, module, or any other source.

In some embodiments (such as shown in FIG. 6), the storage device 630 further stores an authentication database 700. Some examples of databases that may be used in connection with the Authentication Platform 600 will now be described in detail with respect to FIG. 7. Note that the database described herein is only an example, and additional and/or different information may actually be stored therein. Moreover, various databases might be split or combined in accordance with any of the embodiments described herein.

Figure 7:
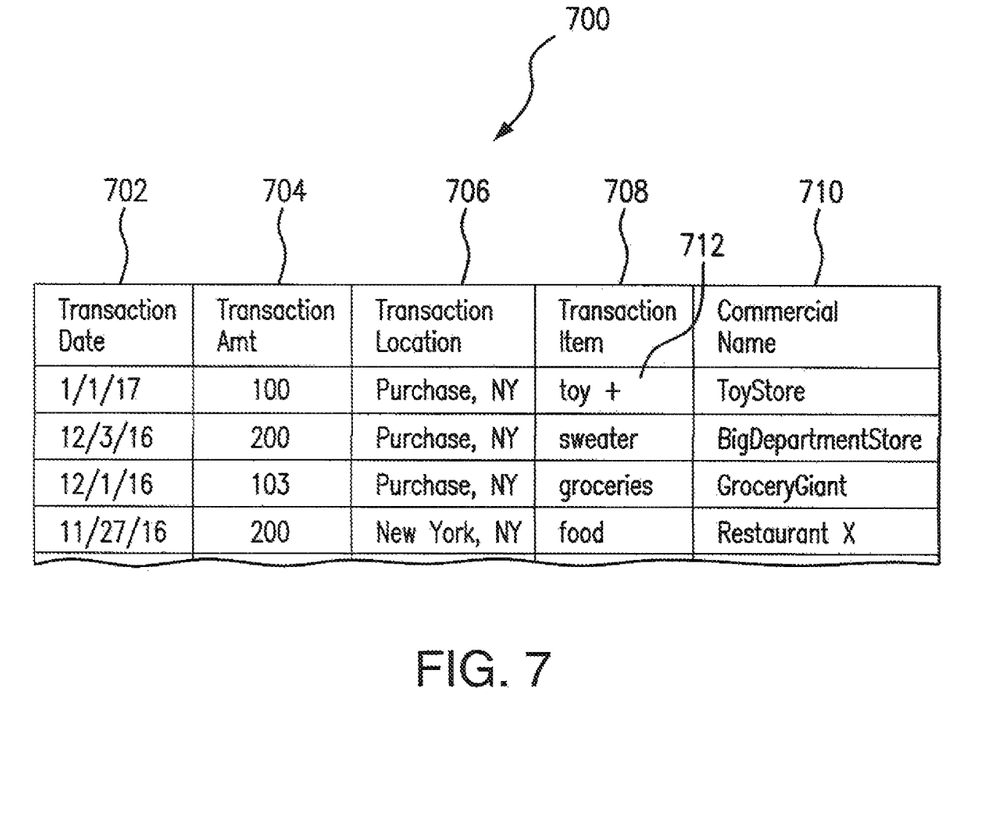
FIG. 7 is a table in accordance with some aspects of some embodiments herein.

Referring to the authentication database in FIG. 7, a table 700 is shown that represents the authentication database 700 that may be stored in memory 630 (Authentication Platform 600) according to some embodiments. The table 700 may include, for example, the authentication record for a given payment card product. The table 700 may define fields 702, 704, 706, 708 and 710 for each of the entries. The fields 702, 704, 706, 708 and 710 may, according to some embodiments, specify: a transaction date 702, a transaction amount 704; a transaction location 706, that may include at least one of a town and a state where the transaction took place, and for online transactions, instead of a physical location, the transaction location may indicate the transaction was online and an association with the Merchant name; a transaction item 708, which may be the actual item (e.g. sweater) or a category of items (e.g., clothing); and a commercial name 710 of the merchant involved in the transaction. In one or more embodiments, a notation 712 in the database may indicate other additional information may be in the field, but not currently shown (e.g., when multiple items are part of a purchase). Other suitable fields may be used in addition to, or instead of, the fields listed herein. The authentication database 700 may be created and updated, for example, based on information electrically received on a periodic basis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a non-transitory computer readable storage medium; the modules can include, for example, any or all of the elements depicted in the block diagrams and/or described herein; by way of example and not limitation, an authentication module. The method steps can then be carried out using the distinct software modules and/or sub-modules of the system, as described above, executing on one or more hardware processors 610 (FIG. 6). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
receiving a request to initiate a purchase transaction with a payment card product;
generating a first message including a request for a user-selectable specified data type about a previous transaction executed with the payment card product;
receiving, in response to the generated first message, a selection, from a cardholder, of the specified data type about the previous transaction executed with the payment card product;
generating a second message to verify an authenticity of the cardholder of the payment card product, wherein the second message includes a request for specified data based on the selected specified data type, about a previous transaction executed with the payment card product;
receiving, in response to the generated second message, input from the cardholder including the specified data;
receiving, at an authentication module stored at a point of sale device, the requested specified data associated with the previous transaction stored on the payment card product;
comparing, via the authentication module, the input from the cardholder to stored data associated with the previous transaction stored on the payment card product; and
one of confirming the cardholder as a true owner of the payment card product or denying the cardholder as the true owner of the payment card product based on the comparison.

2. The method of claim 1, wherein the requested user-selectable specified data type is a request for at least one of a previous transaction amount, a previous transaction item, a previous transaction location, and a previous transaction commercial entity.

3. The method of claim 2, further comprising:
receiving a payment authorization request from the point of sale device when the cardholder is approved as the true owner of the payment card product.

4. The method of claim 1, wherein the previous transaction is one of a most recent previous transaction or an older than most recent transaction.

5. The method of claim 1, wherein the stored data associated with the previous transaction is stored in at least one of a memory of the payment card product and a memory associated with the issuer of the payment card product.

6. The method of claim 5, further comprising:
updating at least one of the memory of the payment card product and the memory associated with the issuer of the payment card product with data associated with the initiated purchase transaction when the initiated purchase transaction is completed.

7. The method of claim 1, further comprising:
approving the cardholder as the true owner of the payment card product when a result of the comparison does not exceed a pre-defined threshold.

8. The method of claim 1, wherein the request to initiate the purchase transaction further comprises:
receiving the payment card product at a point of sale device.

9. The method of claim 1, wherein the request to initiate the purchase transaction further comprises:
receiving a payment account number associated with the payment card product at an issuer.

10. A system comprising:
a device operative to receive a request to initiate a purchase transaction with a payment card product;
a database for storing previous transaction data associated with execution of a previous transaction via a payment card product;
an authentication module operative to authenticate a true owner of the payment card product;
a memory for storing program instructions;
an authentication processor, coupled to the memory, and in communication with the authentication module, and operative to execute program instructions to:
receive a request to initiate a purchase transaction with the payment card product;
generate a first message including a request for a user-selectable specified data type about a previous transaction executed with the payment card product;
receive, in response to the generated first message, a selection, from a cardholder, of the specified data type about the previous transaction executed with the payment card product;
generate a second message to verify an authenticity of the cardholder of the payment card product, wherein the second message includes a request for specified data based on the selected specified data type, about the previous transaction executed with the payment card product;
receive, in response to the generated second message, input from the cardholder including the specified data;
receive, at the authentication module, the requested specified data associated with the previous transaction stored in the database;
compare, via the authentication module, the input from the cardholder to the stored previous transaction data in the database; and
one of confirm the cardholder as a true owner of the payment card product or deny the cardholder as the true owner of the payment card product based on the comparison.

11. The system of claim 10, wherein the requested user-selectable specified data type is a request for at least one of a previous transaction amount, a previous transaction item, a previous transaction location, and a previous transaction commercial entity.

12. The system of claim 10, wherein the previous transaction is one of a most recent previous transaction or an older than most recent transaction.

13. The system of claim 10, wherein the database is stored at least one of: in a memory of the payment card product and in a memory associated with an issuer of the payment card product.

14. The system of claim 10, wherein the authentication module is further operative to:
update the database with data associated with the initiated purchase transaction when the initiated purchase transaction is completed.

15. The system of claim 10, wherein the authentication module is further operative to:
approve the cardholder as the true owner of the payment card product when a result of the comparison does not exceed a pre-defined threshold.

16. The system of claim 10, wherein the request to initiate the purchase transaction is received at a point of sale device.

17. The system of claim 16, wherein the authentication module is stored at the point of sale device and compares the input from the cardholder to data associated with the previous transaction stored in the payment card product.

18. The system of claim 10, wherein the request to initiate the purchase transaction is received at an issuer via entry of a payment account number associated with the payment card product.

19. The system of claim 18, the authentication module is stored at the issuer and compares the input from the cardholder to previous transaction data stored in the database.

* * * * *